(12) United States Patent
Ninomiya et al.

(10) Patent No.: US 7,953,370 B2
(45) Date of Patent: May 31, 2011

(54) CARRIER SENSING METHOD AND RFID TRANSCEIVER DEVICE USING THE SAME

(75) Inventors: Teruhisa Ninomiya, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/204,582

(22) Filed: Aug. 16, 2005

(65) Prior Publication Data

US 2006/0229041 A1 Oct. 12, 2006

(30) Foreign Application Priority Data

Apr. 6, 2005 (JP) ................................. 2005-109546

(51) Int. Cl.
*H04B 7/14* (2006.01)
*H04Q 5/22* (2006.01)
(52) U.S. Cl. ....... 455/41.2; 455/323; 455/258; 340/10.2
(58) Field of Classification Search ..................... 455/39, 455/88, 501, 41.2, 255, 256, 257, 258, 78; 340/10.1, 10.2, 10.4, 10.5, 572.1
See application file for complete search history.

(56) References Cited

U.S. PATENT DOCUMENTS

| | | | |
|---|---|---|---|
| 6,122,329 | A | 9/2000 | Zai et al. |
| 6,588,661 | B2 * | 7/2003 | Degrauwe et al. ............ 235/382 |
| 6,639,509 | B1 | 10/2003 | Martinez |
| 6,700,514 | B2 | 3/2004 | Soltanian et al. |
| 7,092,461 | B1 | 8/2006 | Minnis et al. |
| 2002/0134833 | A1 | 9/2002 | Degrauwe et al. |
| 2003/0174079 | A1 | 9/2003 | Soltanian et al. |
| 2007/0279193 | A1 * | 12/2007 | Tanaka ........................ 340/10.2 |

FOREIGN PATENT DOCUMENTS

| | | |
|---|---|---|
| EP | 1 244 049 | 9/2002 |
| JP | 2-100521 A | 4/1990 |
| JP | 3-055922 A | 3/1991 |
| JP | 2000-004183 A | 1/2000 |
| JP | 2003-516020 A | 5/2003 |
| JP | 2003-273945 A | 9/2003 |
| WO | WO-01/39385 A1 | 5/2001 |

OTHER PUBLICATIONS

European Search Report dated Aug. 22, 2006.
"Japanese Office Action" mailed by JPO and corresponding to Japanese application No. 2005-109546 on Sep. 29, 2009, with English translation.
Japanese Notification of Reason for Rejection, English-language translation, mailed Nov. 30, 2010 for corresponding Japanese Application No. 2010-097493.

* cited by examiner

*Primary Examiner* — Blane J Jackson
(74) *Attorney, Agent, or Firm* — Fujitsu Patent Center

(57) ABSTRACT

An RFID transceiver device is proposed capable of carrier sensing even when the difference with respect to the carrier frequency employed by the other system is close to "0". The device includes a control and signal processing circuit; a local oscillation circuit that generates a local oscillation signal of frequency that is specified by said control and signal processing circuit; and a reception circuit that demodulates the reception signal using the local oscillation signal frequency that is output from said local oscillation circuit; wherein the control and signal processing circuit performs control so as to output, to the local oscillation circuit, a local oscillation signal of a reference frequency in the case of ordinary communication, and output, to the local oscillation circuit, a local oscillation signal shifted by a prescribed frequency with respect to said reference frequency in the case of carrier sensing, as a local oscillation signal for demodulating the reception signal in the reception circuit.

15 Claims, 10 Drawing Sheets

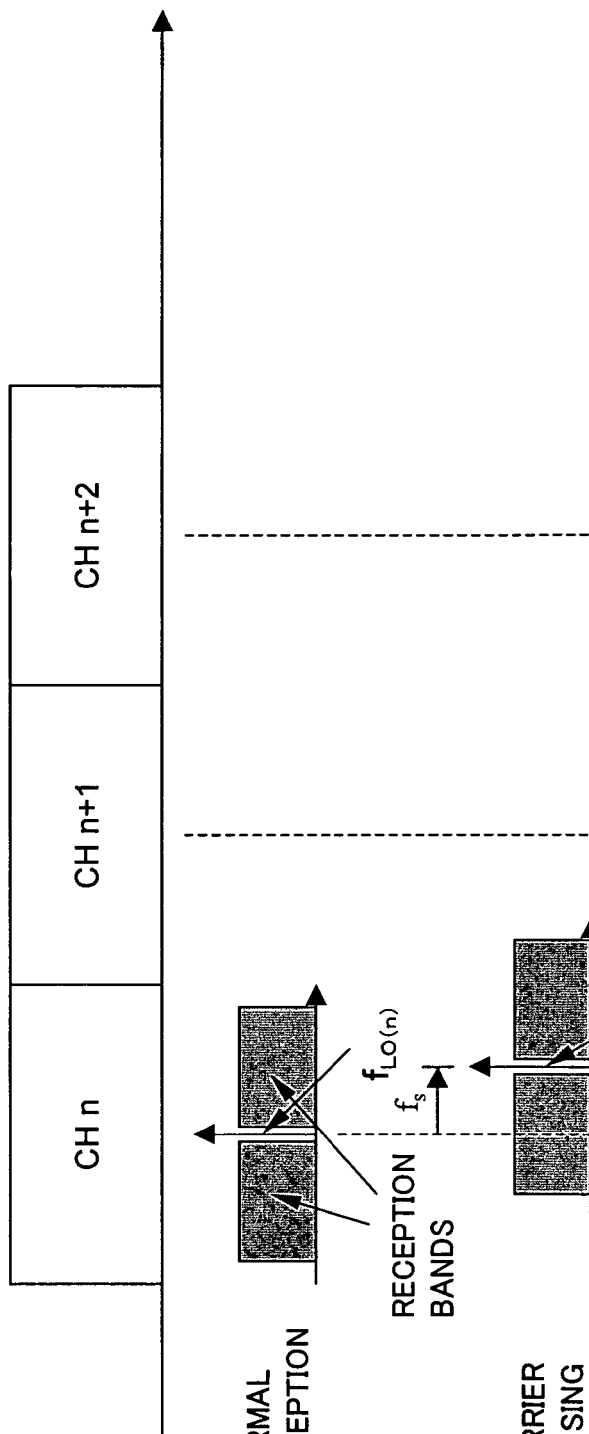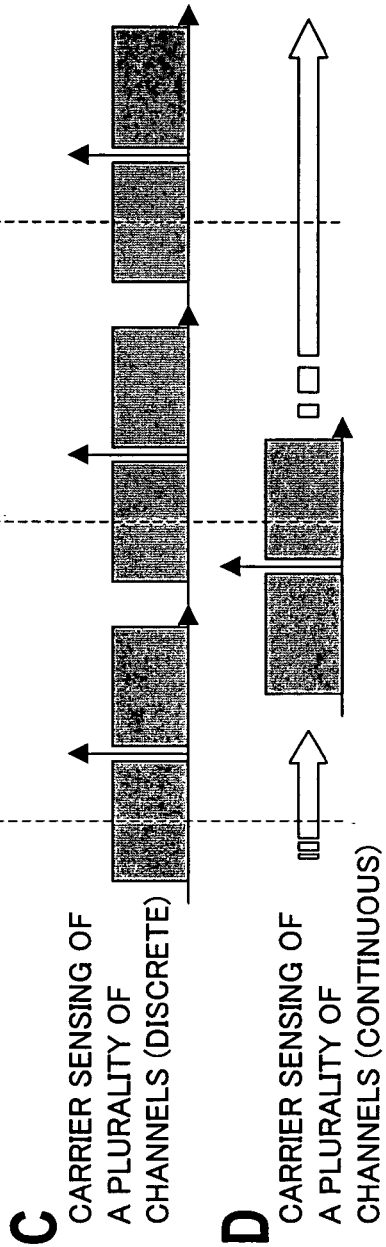

LESS THAN $f_{min}$

MORE THAN $f_{max}$

AC COUPLING CHARACTERISTIC    LPF CHARACTERISTIC

LESS THAN $f_{min}$    MORE THAN $f_{max}$

US 7,953,370 B2

CARRIER SENSING METHOD AND RFID TRANSCEIVER DEVICE USING THE SAME

CROSS-REFERENCE TO RELATED APPLICATIONS

This application is based upon and claims the benefit of priority from the prior Japanese Patent Application No. 2005-109546, filed on Apr. 6, 2005, the entire contents of which are incorporated herein by reference.

BACKGROUND OF THE INVENTION

1. Field of the Invention

The present invention relates to a carrier sensing method and RFID transceiver device using the same.

2. Description of the Related Art

RFID (radio frequency identification) systems are employed in various applications. In such systems, a carrier signal is transmitted from an interrogator to a transponder, the carrier signal that is reflected (back-scattered) from the transponder is received, and the modulation signal component that is contained in the back-scattered carrier signal is processed as information data from the transponder.

The interrogator is an RFID transceiver device called a reader/writer (RW). The transponder may be of various types, one of which is an IC tag. Furthermore, the RFID system shares the frequency band which it uses for communication with the tag with other RFID receivers or other communication devices so, in order to avoid collision, it is necessary for the RFID system to confirm prior to transmission that the frequency that the system plans to use itself is not being employed by another system. This is called carrier sensing.

FIG. 1 is a view given in further explanation of carrier sensing. Prior to transmission, the RFID transceiver device 1A that is preparing to transmit ascertains whether or not any other RFID transceiver devices 1B are already in communication with an IC tag 1C by detecting the presence of the carrier signal that is exchanged between the RFID transceiver devices 1B and the IC tag 1C.

FIG. 2 is an example of the block diagram of an RFID transceiver device. A signal processing circuit 10 that is connected through the external interface (I/F) with a data processing device, not shown, controls a local oscillation circuit 11 to generate a local oscillation signal corresponding to the channel that is used.

Specifically, as shown in FIG. 3, the RFID system uses a plurality of channels (10 channels in the example of FIG. 3) in for example a 2 MHz frequency band. The control and signal processing circuit 10 performs control such that a local oscillation signal of frequency corresponding to one of the channels of this plurality of channels is output from the local oscillation circuit 11.

In this RFID transceiver device block diagram shown in FIG. 2, when carrier sensing is performed, transmission output from a transmission circuit 12 is suspended, in order to confirm that the frequency (channel) that the RFID transceiver device itself plans to use is not being used by another RFID transceiver device.

When a reception circuit 14 receives a carrier signal of the frequency that is planned to be used corresponding to the local oscillation frequency that is output from the local oscillation circuit 11, the reception circuit 14 outputs the received demodulated signal to the control and signal processing circuit 10. When the control and signal processing circuit 10 receives the received demodulated signal from the reception circuit 14, it assumes that it is impossible to use a channel wherein a carrier signal is already in existence and successively shifts the frequency of the local oscillation signal that is output from the local oscillation circuit 11 until it can find a free channel.

When it thus finds a free channel, as shown in FIG. 4, the RFID transceiver device performs communication in the communication period P2 following the period P1 of carrier sensing (CS), using the carrier frequency of the free channel that has been found, for communication with the tag. The transmission circuit 12 modulates the carrier frequency signal that is output from the local oscillation signal generating circuit 11 with the command signal before emitting it from the transceiving antenna 16 through the duplexer 13.

The corresponding tag modulates the received carrier frequency signal with information data and transmits this as a response signal to the RFID transceiver device. The RFID transceiver device acquires the information data by demodulating the response signal that is transmitted back thereto.

While the RFID transceiver device executes communication with the IC tag in this way, it is undesirable that communication using a specified carrier frequency should be performed exclusively by a specified RFID transceiver device. Control is therefore effected so as to free the channel after lapse of a fixed time, by restricting the transmission period (period P2).

The block diagram of the reception circuit 14 is assumed to be a DC directly coupled reception system (FIG. 5A) or AC coupled reception system (FIG. 5B) as shown in FIG. 5.

Let us assume that, in the carrier sensing period (P1 in FIG. 4) another system is performing communication using the frequency that is planned to be used. The frequency of the carrier signal of the other RFID transceiver device that is in the course of communication (for example 1B in FIG. 1), being input to the demodulator 140 included in the reception circuit 14, is ($f_{LO}+\Delta f$). The frequency offset $\Delta f$ is the frequency difference caused by the fact that the RFID transceiver device that is currently preparing to transmit (for example 1A of FIG. 1) and the RFID transceiver device 1B that is currently communicating have reference oscillation sources that are independent of each other.

In the block diagram of the reception circuit 14 shown in FIG. 5A, the output of the local oscillation circuit 11 (frequency $f_{LO}$) and the reception signal of frequency ($f_{LO}+\Delta f$) are mixed in the demodulating circuit 140. The frequency offset component $\Delta f$ then appears at the output of the demodulating circuit 140. This frequency component $\Delta f$ is therefore amplified by amplifier 141 and input through a low pass filter 142 to the control and signal processing circuit 10 after being converted to a corresponding digital signal by means of an analog/digital converter 143.

In this way, it is possible for the control and signal processing circuit 10 to identify whether the channel in question is in use by another RFID transceiver device even if $\Delta f$ is a frequency component close to "0".

Since, in the case where the IC tag is a passive tag, the operating power (power source energy) is obtained from the electromagnetic wave transmitted by the RFID transceiver device, the RFID transceiver device needs to have large transmission power. In contrast, since the response transmission from the IC tag is performed by back scattering, its power is very weak in comparison with the power of the electromagnetic wave transmitted by the RFID transceiver device.

Thus, the RFID transceiver device whose communication partner is a passive IC tag needs to have high output power in order to supply power source energy to the IC tag and, at the same time, must be provided with a high sensitivity reception capability, since the back-scattered signal from the passive IC tag is very weak.

Also, providing the RFID transceiver device with separate antennas for transmission and reception is undesirable from the point of view of cost and size. A transceiving antenna 16 is therefore employed. A duplexer 13 that isolates the route of the transmission and reception signal and that is connected with the common antenna 14 is therefore provided. By means of the duplexer 13, carrier signals from the transmission circuit 12 are fed to the antenna 14 and back-scattered signals from the IC tag received by the antenna 14 are fed to the reception circuit 14.

Inventions related to such an RFID system are disclosed in for example U.S. Pat. No. 6,639,509 and in U.S. Pat. No. 6,122,329.

U.S. Pat. No. 6,639,509 discloses a configuration in which carrier demodulation is performed with the object of reducing high frequency componets in a reception circuit of an RFID transceiver device.

Also, the invention disclosed in U.S. Pat. No. 6,122,329 makes it possible to reproduce a back-scattered data signal using an RFID transceiver device (interrogator) in a condition accompanied by abrupt movement of the tag (transponder).

As described above, in an RFID transceiver device, the energy of the carrier signal that is output from the transmission circuit 12 is large, since high output is demanded in order to supply power source energy to the IC tag: this results in a leakage component 15 to the reception circuit 14 passing through the duplexer 13. When this leakage component is input to the demodulating circuit 140, a high level DC component is output from the demodulating circuit 140, causing saturation in the downstream amplifier and other circuits.

In a typical reception circuit 14, as shown in FIG. 5B, the DC component is therefore removed by for example AC coupling achieved by providing a capacitor 144 on the output side of the demodulating circuit 140. There is therefore the problem that, when carrier sensing is performed, if the frequency offset Δf from the other RFID transceiver device is close to "0", carrier sensing cannot be accurately performed due to the effect of DC component removal.

Furthermore, neither the above U.S. Pat. No. 6,639,509 nor U.S. Pat. No. 6,122,329 discuss the problem of carrier sensing.

SUMMARY OF THE INVENTION

An object of the present invention is therefore to provide a carrier sensing method capable of carrier sensing even when the difference with respect to the carrier frequency employed by the other system that shares the frequency is close to "0", and an RFID transceiver device and RFID system employing this method.

According to a first aspect of an RFID transceiver device for achieving the above object, there are provided a control and signal processing circuit, a local oscillation circuit that generates a local oscillation signal of frequency that is set by said control and signal processing circuit, and a reception circuit that demodulates the reception signal using the local oscillation signal that is output from said local oscillation circuit; and said control and signal processing circuit performs control so as to output, to the local oscillation circuit, a local oscillation signal of a reference frequency in the case of ordinary communication, and output, to the local oscillation circuit, a local oscillation signal shifted by a prescribed frequency with respect to said reference frequency in the case of carrier sensing, as a local oscillation signal for demodulating the reception signal in the reception circuit According to a second aspect of an RFID transceiver device for achieving the above object, in the first aspect, the magnitude of the prescribed frequency shift with respect to said reference frequency is larger than the sum of the maximum deviation of the reception signal frequency from the reference frequency and the maximum deviation of the local oscillation frequency from a desired frequency specified by a control circuit, and the difference frequency between the reception signal and the local oscillation signal frequency is set so as to be contained in the bandwidth of the reception circuit.

According to a third aspect of an RFID transceiver device for achieving the above object, in the first aspect, during carrier sensing, the control and signal processing circuit controls the local oscillation circuit so as to sweep the reference frequency in a discrete fashion with respect to a plurality of channels until a free channel is found, taking the reference frequency as the center frequency of the bandwidth of each prescribed channel.

According to a fourth aspect of an RFID transceiver device for achieving the above object, in the first aspect, during carrier sensing, the control and signal processing circuit controls the local oscillation circuit so as to sweep the reference frequency in a continuous fashion with respect to a plurality of channels until a free channel is found, taking the reference frequency as the center frequency of the bandwidth of each prescribed channel.

According to the present invention, accurate carrier sensing can be achieved. Consequently, efficient application of an RFID system can thereby be achieved and effective frequency utilization becomes possible.

The characteristics of the present invention will be further clarified by embodiments of the invention, that are described below with reference to the drawings.

BRIEF DESCRIPTION OF THE DRAWINGS

FIG. 8 is a view given in explanation of further characteristics of the present invention;

DESCRIPTION OF THE PREFERRED EMBODIMENTS

Embodiments of the present invention are described below with reference to the drawings. It should be noted that the embodiments are given merely to facilitate understanding of the present invention and the technical scope of the present invention is not intended to be restricted thereto.

Figure 1:
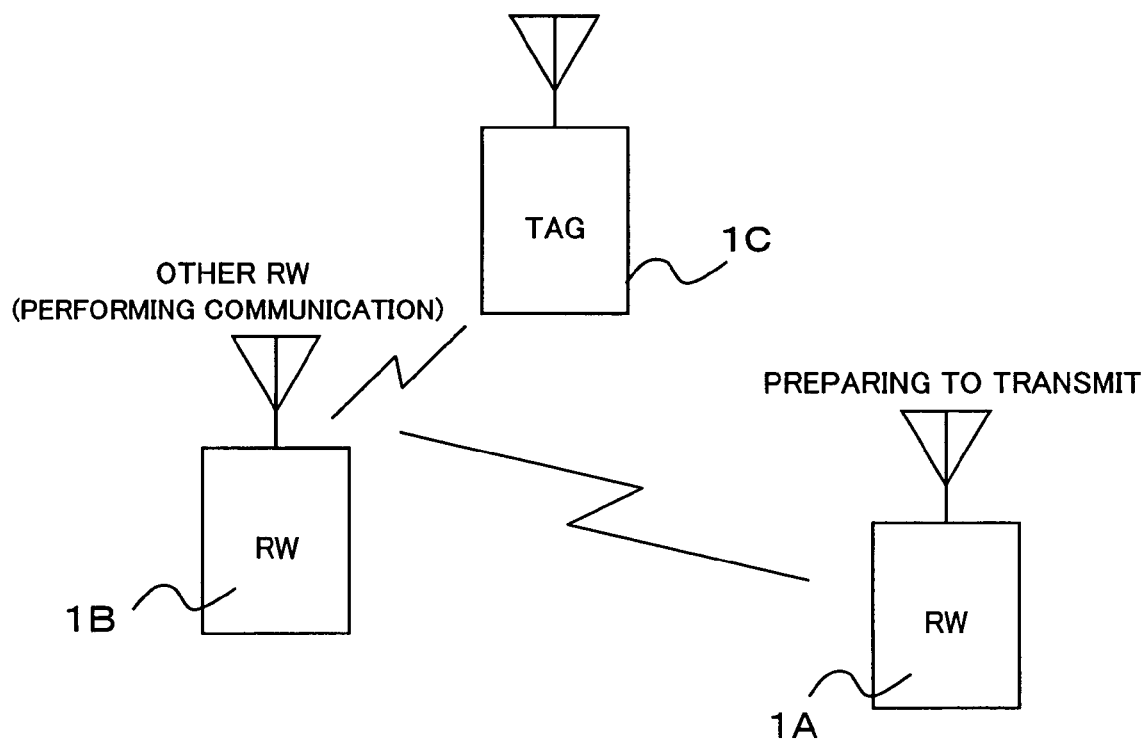
FIG. 1 is a view further describing carrier sensing.
Figure 2:
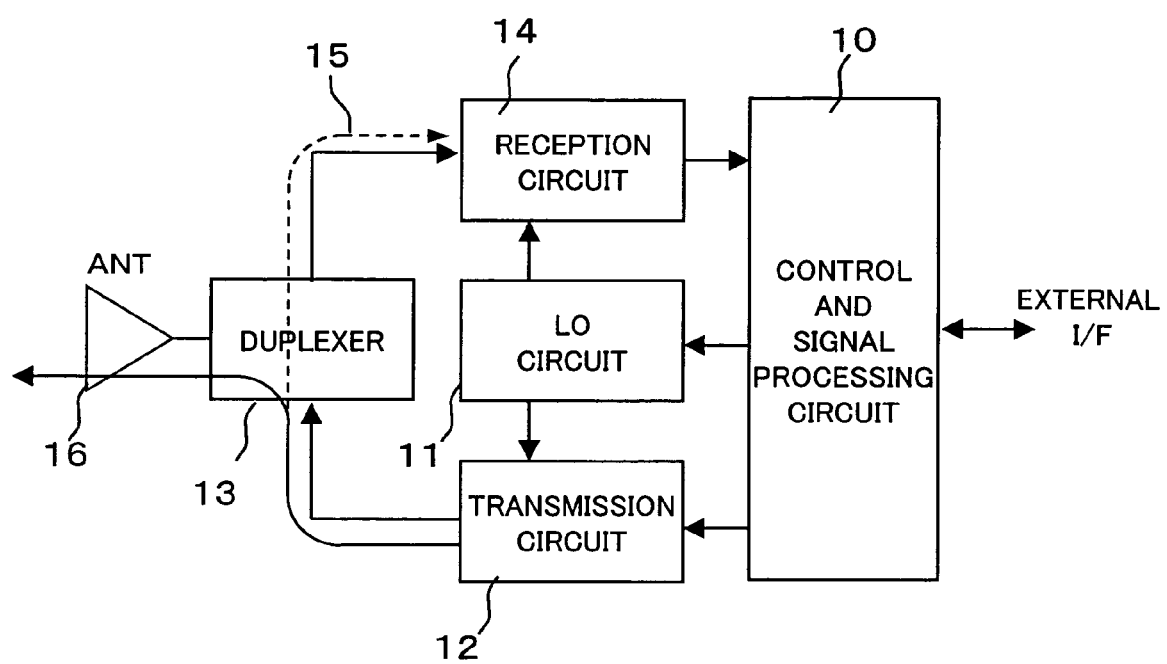
FIG. 2 is an example of the block diagram of an RFID transceiver device.
Figure 3:
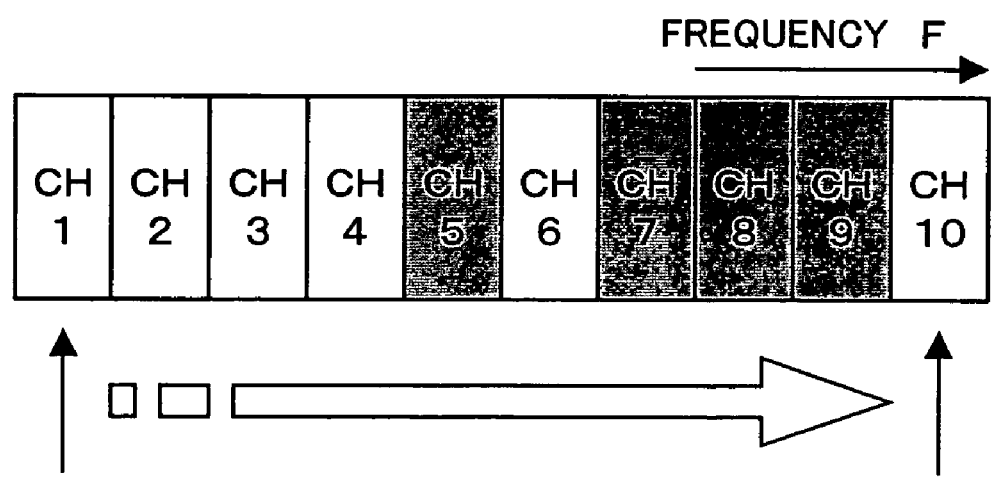
FIG. 3 is a view given in explanation of the disposition of a plurality of channels in an RFID system.
Figure 4:
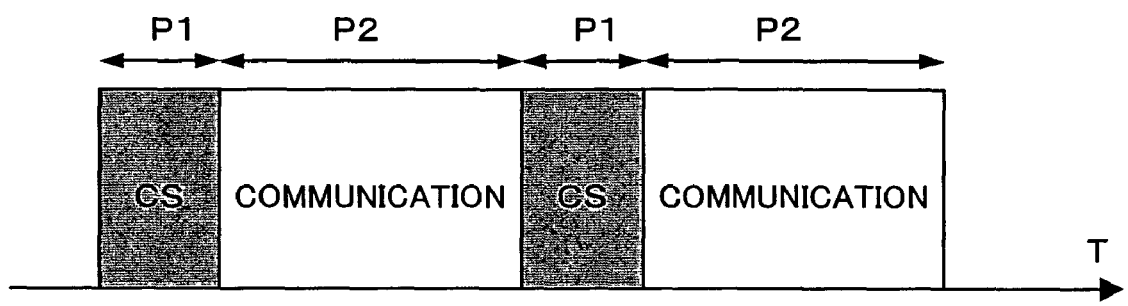
FIG. 4 is a view given in explanation of the carrier sensing (CS) period and transmission period (period P2)
Figure 5A:
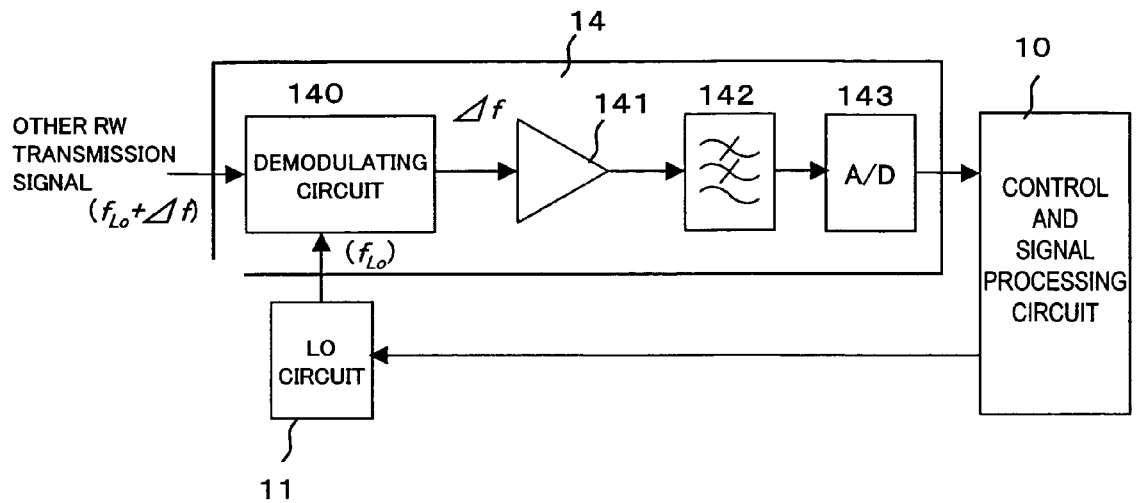
FIG. 5 is a view given in explanation of the block diagram of reception circuits using the DC directly coupled reception system and AC coupled reception system, respectively.
Figure 5B:
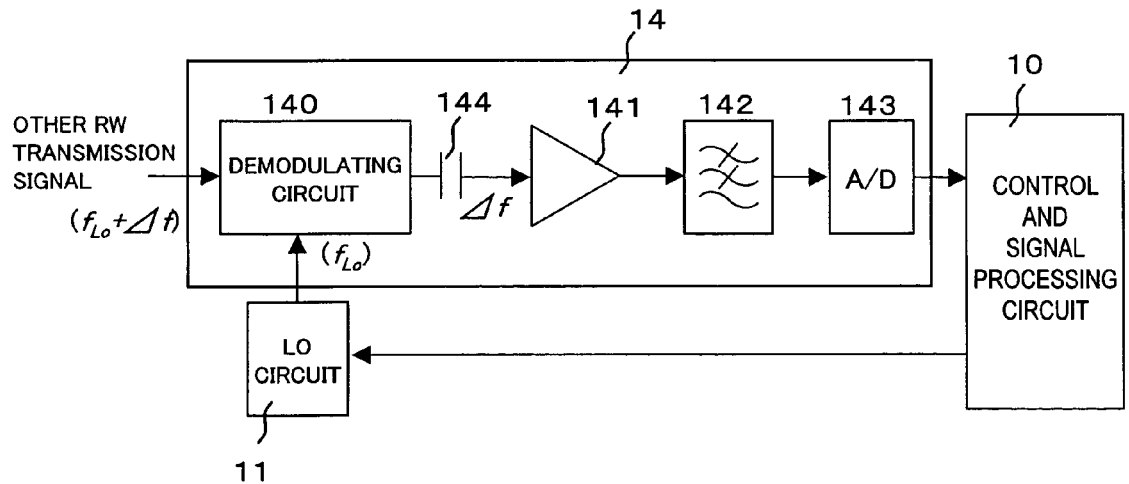
Figure 6:
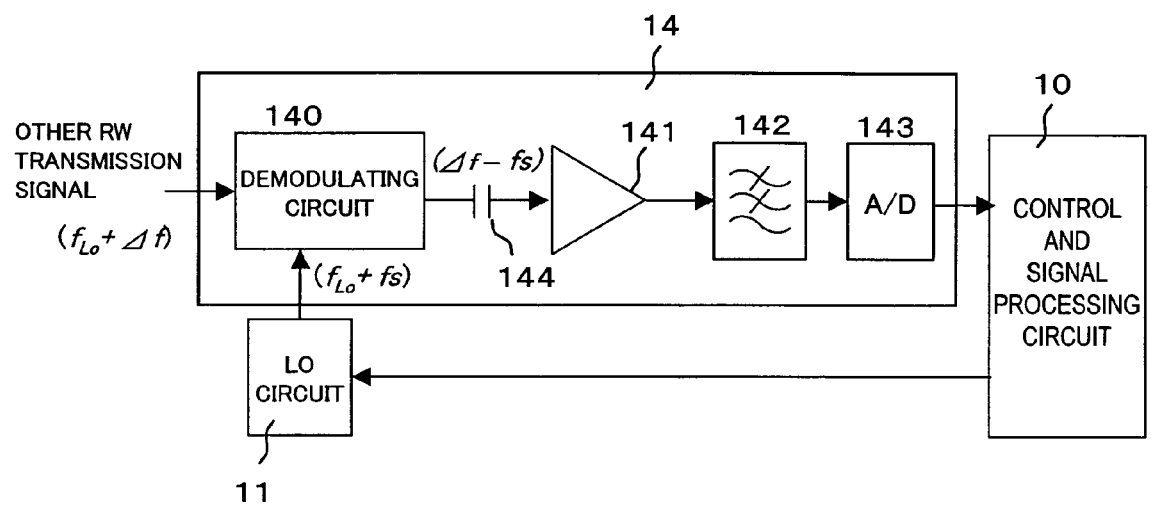
FIG. 6 is a block diagram of a first embodiment of an RFID transceiver device according to the present invention.

FIG. 6 is a block diagram of a first embodiment of an RFID transceiver device according to the present invention.

A feature of the present invention is that, when performing carrier sensing, a demodulation local oscillation frequency ($f_{LO}$+fs) that is shifted in frequency by a prescribed frequency fs with respect to the reference local oscillation frequency $f_{LO}$ that is employed when ordinary communication with an IC tag is performed.

Figure 7:
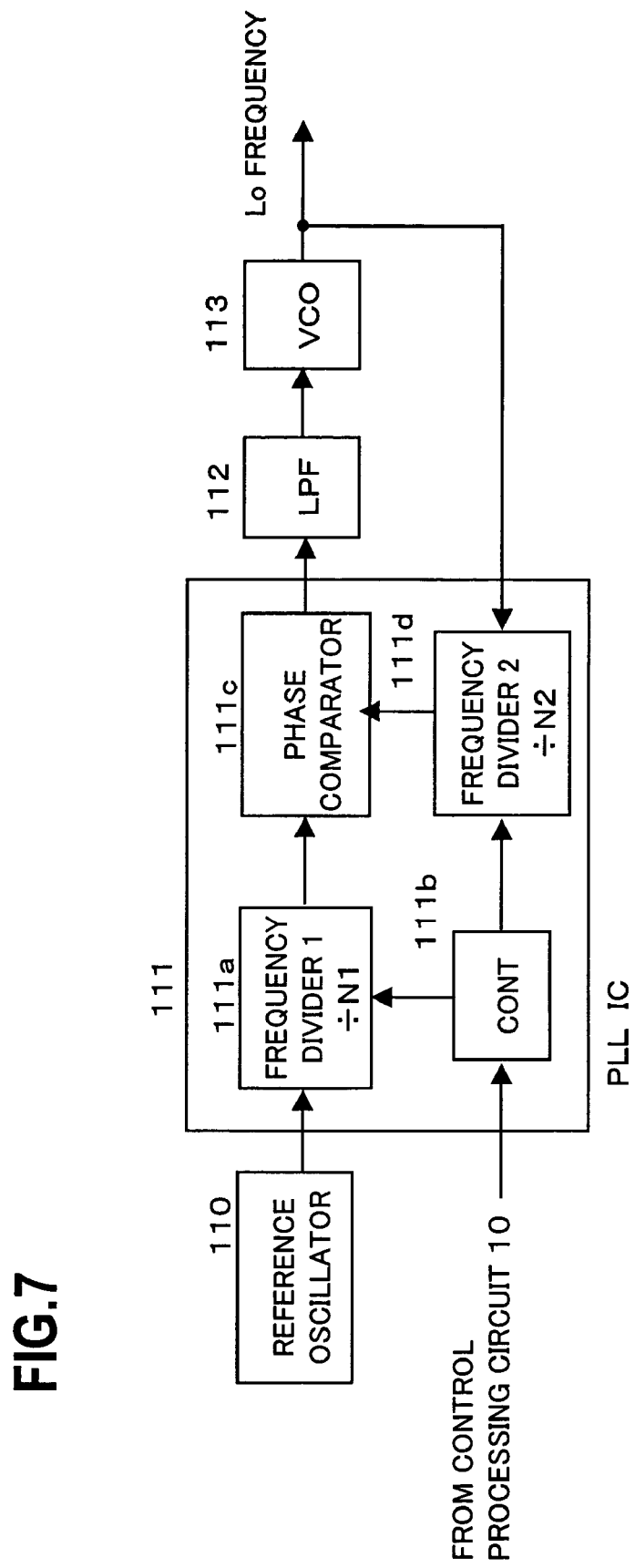
FIG. 7 is a block diagram of an example of the block diagram of a carrier signal oscillator 11.

FIG. 7 is a block diagram of an example of the block diagram of a local oscillation signal oscillator 11 for implementing the above feature.

A reference signal source 110 outputs a reference oscillation frequency $f_{REF}$ of high precision. The frequency division ratios N1, N2 of a frequency divider 111a and frequency divider 111d are set by a control circuit 111b under the control of a control signal from the control and signal processing circuit 10.

If the frequency division ratios of the frequency divider 111a and frequency divider 111d are respectively N1 and N2, a feedback loop is operated so as to make the output frequency of the voltage controlled oscillator 113 coincide with N2/N1 times the reference oscillation frequency $f_{REF}$. The frequency division ratios N1, N2 of the frequency divider 111a and frequency divider 111d are set such that the output frequency of the voltage controlled oscillator 113 during ordinary communication is the reference frequency $f_{LO}$.

Next, in carrier sensing, the control circuit 111b controls the frequency division ratios N1, N2 of the frequency divider 111a and frequency divider 111d such that the output frequency of the voltage controlled oscillator 113 is ($f_{LO}$+fs), using a different control signal from the control and signal processing circuit 10.

FIG. 8 is a view given in further explanation of the features of the present invention. FIG. 8A is a view showing the case where a channel CHn is designated as the frequency planned to be used; communication with the IC tag is performed using the center frequency $f_{LO}$(n) that is employed for communication, the two side bands thereof being employed as reception bands RB.

Before communication, carrier sensing is performed in order to ascertain whether or not the channel CHn is a free channel. In this process, according to the present invention, carrier sensing is performed (see FIG. 8B) using the frequency ($f_{LO}$(n)+fs) obtained by shifting the local oscillation frequency $f_{LO}$(n) corresponding to the channel CHn by a prescribed frequency fs.

Returning to the description of FIG. 6, if the reception frequency of the carrier signal from another RFID transceiver device is ($f_{LO}$+Δf), the output of the demodulating circuit 140 is (Δf−fs). Thus, even if the frequency offset Δf with respect to the transmission carrier signal frequency of the other RFID transceiver device is close to "0", the frequency component (Δf−fs) of the output of the demodulating circuit 140 obtained by frequency shift by a prescribed frequency fs is output without being blocked by the AC coupling capacitor 144.

The control and signal processing circuit 10 can therefore ascertain whether or not the carrier frequency $f_{LO}$ in question is being employed by another RFID transceiver device, by detecting the presence of a digital signal corresponding to (Δf−fs) from the A/D converter 143.

If it is determined by carrier sensing in FIG. 8B that the channel CHn is not a free channel, carrier sensing is repeated, shifting the center frequency (carrier frequency) so as to correspond successively with the channel CHn+1, CHn+2, . . . until a free channel is detected.

As a method of shifting the carrier (channel shifting), as shown in FIG. 8C, the method may be employed of shifting the local oscillation frequency from the local oscillation circuit 11 that is supplied to the demodulating circuit 140 in a discrete fashion corresponding to the channel. Also, as another method, as shown FIG. 8D, the method may be employed of shifting the local oscillation frequency from the local oscillation circuit 11 that is supplied to the demodulating circuit 140 continuously. In this way, it is possible to search for a free channel on which no carrier can be detected.

Next, the magnitude of the frequency fs by which the shift from the reference frequency $f_{LO}$ during carrier sensing is effected will be examined with reference to FIG. 9.

Figures 9A, 9B:
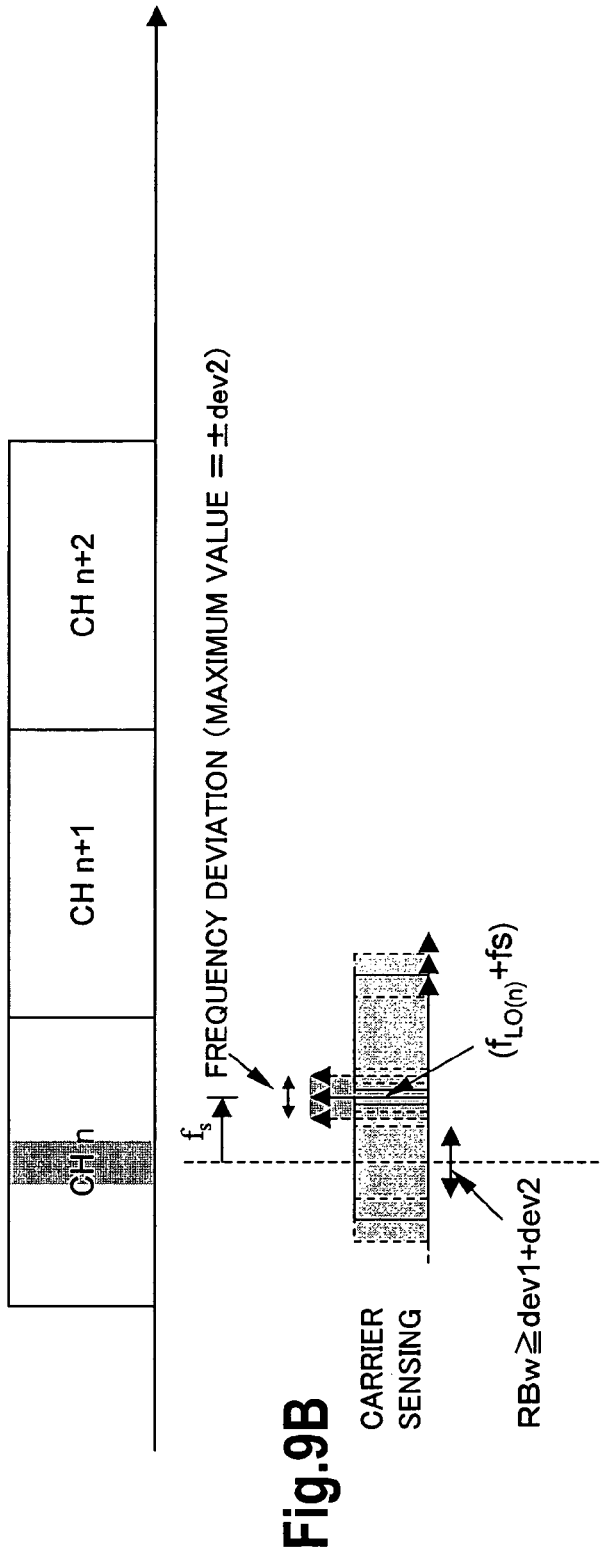
FIG. 9 is a view examining the magnitude of frequency shift fs from the reference frequency $f_{LO}$ during carrier sensing.

FIG. 9A shows the disposition of the plurality of channels CHn, CHn+1, CHn+2, . . . . Focusing now on the channel CHn as the channel that is planned to be used, the reception bands RB (see FIG. 8A) must be guaranteed taking into consideration the range of the frequency offset Δf of the transmission signal of other systems with respect to the center frequency $f_{LO}$(n).

The factors that generate the frequency offset Δf include the frequency deviation (maximum value: dev1) of other systems, as shown in FIG. 9A and the deviation of the local oscillation frequency (maximum value: dev2) as shown in FIG. 9B. Consequently, as shown in FIG. 9B, as the frequency shift fs from the central frequency $f_{LO}$(n) must be set so as to be larger than the guaranteed reception bandwidth RBw (dev1+dev2≧Δf)

FIG. 9Ba, FIG. 9Bb and FIG. 9Bc are partial views of FIG. 9B given to facilitate understanding, respectively showing the set (target) position of the local oscillation frequency, the maximum position in the "−" direction of local oscillation frequency offset and the maximum position in the "+" direction of local oscillation frequency offset. The largest of the maximum deviation in the "−" direction and the maximum deviation in the "+" direction of the frequency offset is defined as dev2. Although not shown in the drawings, the maximum value dev1 of the frequency deviation of the reception signal is likewise defined by the largest of the maximum values of the deviation in the "+" and "−" directions.

Figure 10A:
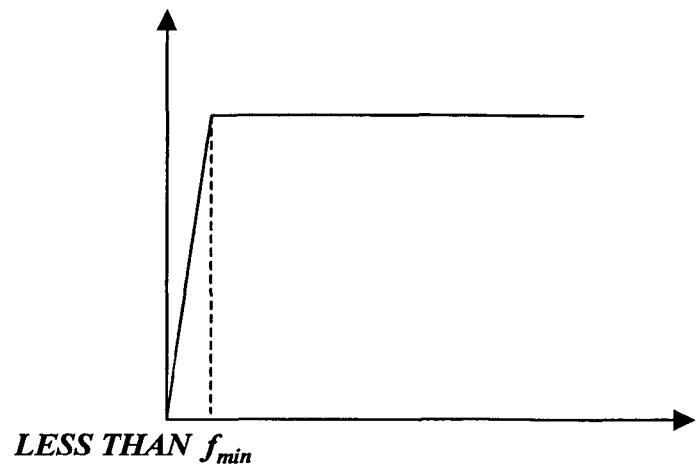
FIG. 10 is a view given in explanation of the passband of a reception circuit 14.
Figure 10B:
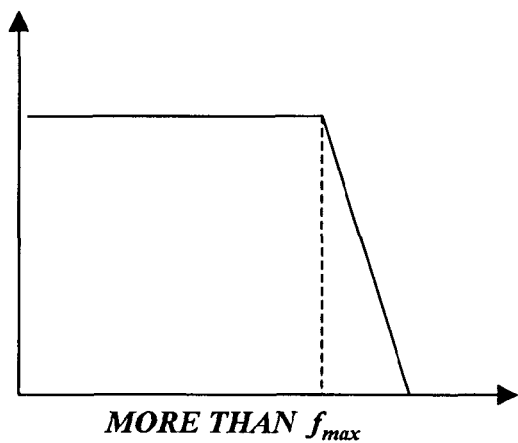
Figure 10C:
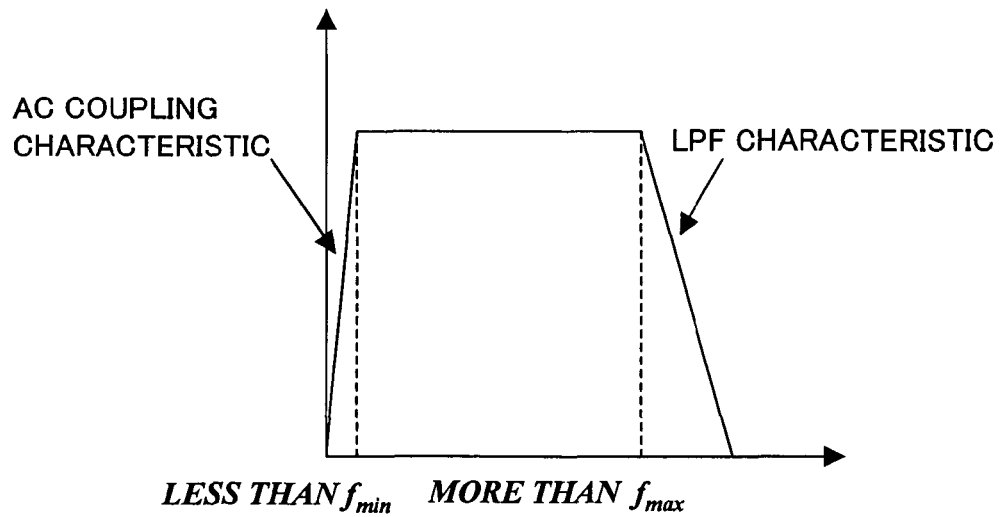

FIG. 10 is a view showing the bandwidth of the reception circuit 14. Optimization of the reception performance in normal communication and minimization of interference with adjacent channels are performed by forming a bandpass characteristic (FIG. 10C) that is formed by the highpass characteristic (FIG. 10A) of the capacitor 144 that is provided for AC coupling and the lowpass characteristic of the low-pass filter 142. A further condition on the frequency fs of shifting from the center frequency $f_{LO}$(n) is that it is necessary that the difference frequency between the reception signal (carrier frequency of the other system) and the local oscillation signal should be contained in the bandwidth shown in FIG. 10C.

In an RFID system, during carrier sensing of the channel frequency that is planned to be used, the present invention makes it possible to perform carrier sensing in a precise manner even if the frequency difference Δf generated by non-synchronization of the carrier signal oscillation circuits of the RFID transceiver devices is close to "0". Therefore, the reliability of the RFID system can be enhanced.

What is claimed is:

1. A transceiver device for communicating with a tag comprising:
   a local oscillation circuit to generate a local oscillation signal;
   a transmission circuit to transmit a carrier frequency signal to a tag;

a reception circuit to receive, from the tag, the carrier frequency signal modulated with information data at the tag;

a duplexer connected to the transmission circuit and the reception circuit; and a control and signal processing circuit to control the local oscillation circuit to generate during an ordinary communication, the local oscillation signal as having a reference frequency which corresponds to one of a plurality of communication channels, for the tag, and to generate during sensing whether a carrier is present transmitted from another transceiver prior to the ordinary communication with the tag, the local oscillation signal as having a frequency, which is shifted by a prescribed frequency with respect to the reference frequency, wherein the reception circuit includes a demodulating circuit to demodulate the carrier frequency signal modulated with information data input through the duplexer, by using the local oscillation signal shifted by the prescribed frequency, and a capacitor circuit to cut off a direct current component from an output of the demodulating circuit.

2. The transceiver device according to claim 1, wherein the magnitude of the prescribed frequency shifted with respect to said reference frequency is larger than the sum of the maximum frequency deviation of said reception signal and the maximum frequency deviation of the local oscillation signal generated from the local oscillation circuit.

3. The transceiver device according to claim 1, wherein, during sensing whether a carrier is transmitted from another transceiver prior to the ordinary communication with the tag, said control and signal processing circuit controls said local oscillation circuit so as to sweep said reference frequency in a discrete fashion with respect to the plurality of communication channels until a free channel is found, taking the reference frequency as the center frequency of the bandwidth of each prescribed channel.

4. The transceiver device according to claim 1, wherein, during sensing whether a carrier is transmitted from another transceiver prior to the ordinary communication with the tag, said control and signal processing circuit controls said local oscillation circuit so as to sweep said reference frequency in a continuous fashion with respect to the plurality of communication channels until a free channel is found, taking said reference frequency as the center frequency of the bandwidth of each prescribed channel.

5. A transmission system in which a transceiver device sends a carrier frequency signal to a tag, and and the transceiver device receives from the tag, the carrier frequency signal modulated with information data at the tag, wherein the transceiver device includes:

a local oscillation circuit to generate a local oscillation signal;

a transmission circuit to transmit a carrier frequency signal to a tag;

a reception circuit to receive from the tag, the carrier frequency signal modulated with information data at the tag;

a duplexer connected to the transmission circuit and the reception circuit; and a control and signal processing circuit to control the local oscillation circuit to generate during an ordinary communication the local oscillation signal as having a reference frequency which corresponds to one of a plurality of communication channels, for the tag, and to generate during sensing whether a carrier is present transmitted from another transceiver prior to the ordinary communication with the tag, the local oscillation signal as having a frequency, which is shifted by a prescribed frequency with respect to the reference frequency, wherein the reception circuit includes a demodulating circuit to demodulate the carrier frequency signal modulated with information data input through the duplexer, by using the local oscillation signal shifted by the prescribed frequency, and a capacitor circuit to cut off a direct current component from an output of the demodulating circuit.

6. The transmission system according to claim 5, wherein the magnitude of the prescribed frequency shifted with respect to said reference frequency is larger than the sum of the maximum frequency deviation of said reception signal and the maximum frequency deviation of the local oscillation signal generated from the local oscillation circuit.

7. The transmission system according to claim 5, wherein, during sensing whether a carrier is transmitted from another transceiver prior to the ordinary communication with the tag, said transceiver device sweeps said reference frequency in a discrete fashion with respect to the plurality of communication channels until a free channel is found, taking the reference frequency as the center frequency of the bandwidth of each prescribed channel.

8. The transmission system according to claim 5, wherein, during sensing whether a carrier is transmitted from another transceiver prior to the ordinary communication with the tag, said transceiver device sweeps said reference frequency in a continuous fashion with respect to the plurality of communication channels until a free channel is found, taking said reference frequency as the center frequency of the bandwidth of each prescribed channel.

9. A carrier sensing method in a transmission system, in which a carrier frequency signal is transmitted from a transceiver device to a tag and said carrier frequency signal is modulated at the tag by information data and reflected from the tag, and the transceiver device acquires said information data by demodulating the modulated carrier frequency signal reflected from said tag, the method comprising:

in a local oscillation circuit of the transceiver device, generating a local oscillation signal;

in a transmission circuit of the transceiver device, transmitting a carrier frequency signal to the tag;

in a reception circuit, receiving from the tag, a carrier frequency signal modulated with information data at the tag;

in a control and signal processing circuit of the transceiver device, controlling the local oscillation circuit to output during an ordinary communication, the local oscillation signal as having a reference frequency which corresponds to one of a plurality of communication channels, for the tag, and to output during sensing whether a carrier is present transmitted from another transceiver prior to the ordinary communication with the tag, the local oscillation signal as having a frequency, which is shifted by a prescribed frequency with respect to the reference frequency;

in a demodulating circuit of the transceiver device, demodulating the carrier frequency signal modulated with information data input through a duplexer which is connected to the transmission circuit and the reception circuit, by using the local oscillation signal shifted by the prescribed frequency; and cutting off a direct current component from an output of the demodulating circuit by a capacitor.

10. The carrier sensing method according to claim 9, wherein the magnitude of the prescribed frequency shifted with respect to said reference frequency is larger than the sum of the maximum frequency deviation of said reception signal and the maximum frequency deviation of the local oscillation signal generated from the local oscillation circuit.

11. The carrier sensing method according to claim 9, wherein, during sensing whether a carrier is transmitted from another transceiver prior to the ordinary communication with the tag, said local oscillation circuit is controlled so as to sweep said reference frequency in a discrete fashion with respect to the plurality of communication channels until a free channel is found, taking the reference frequency as the center frequency of the bandwidth of each prescribed channel.

12. The carrier sensing method according to claim 9, wherein, during sensing whether a carrier is transmitted from another transceiver prior to the ordinary communication with the tag, said local oscillation circuit is controlled so as to sweep said reference frequency in a continuous fashion with respect to the plurality of communication channels until a free channel is found, taking said reference frequency as the center frequency of the bandwidth of each prescribed channel.

13. A transceiver device for communicating with a tag comprising:
   a local oscillation circuit to generate a local oscillation signal;
   a transmission circuit to transmit a carrier frequency signal to a tag;
   a reception circuit to receive from the tag, the carrier frequency signal modulated with information data at the tag;
   a duplexer connected to the transmission circuit and the reception circuit; and
   a control and signal processing circuit to control the local oscillation circuit to generate during an ordinary communication, the local oscillation signal as having a reference frequency which corresponds to one of a plurality of communication channels, for the tag, and to generate during sensing whether a carrier is present transmitted from another transceiver prior to the ordinary communication with the tag, the local oscillation signal as having a frequency, which is shifted by a prescribed frequency with respect to the reference frequency,
   wherein the reception circuit includes a demodulating circuit to demodulate the carrier frequency signal modulated with the information data input through the duplexer, by using the local oscillation signal shifted by the prescribed frequency, and a circuit to cut off a direct current component from the output of the demodulating circuit.

14. A transmission system in which a transceiver device sends a carrier frequency signal to a tag, and the transceiver device receives from the tag, the carrier frequency signal modulated with information data at the tag, wherein the transceiver comprises:
   a local oscillation circuit to generate a local oscillation signal;
   a transmission circuit to transmit a carrier frequency signal to a tag;
   a reception circuit to receive from the tag, the carrier frequency signal modulated with information data at the tag;
   a duplexer connected to the transmission circuit and the reception circuit;
   a control and signal processing circuit to control the local oscillation circuit to generate during an ordinary communication the local oscillation signal as having a reference frequency which corresponds to one of a plurality of communication channels, for the tag, and to generate during sensing whether a carrier is present transmitted from another transceiver prior to the ordinary communication with the tag, the local oscillation signal as having a frequency, which is shifted by a prescribed frequency with respect to the reference frequency wherein the reception circuit includes a demodulating circuit to demodulate the carrier frequency signal modulated with information data input through the duplexer, by using the local oscillation signal shifted by the prescribed frequency, and a circuit to cut off a direct current component from the output of the demodulating circuit.

15. A carrier sensing method in a transmission system, in which a carrier frequency signal is transmitted from a transceiver device to a tag and said carrier frequency signal is modulated at the tag by information data and reflected from the tag, and the transceiver device acquires said information data by demodulating the modulated carrier frequency signal reflected from said tag, the method comprising:
   in a local oscillation circuit of the transceiver device, generating a local oscillation signal;
   in a transmission circuit of the transceiver device, transmitting a carrier frequency signal to the tag;
   in a reception circuit, receiving from the tag, a carrier frequency signal modulated with information data at the tag;
   in a control and signal processing circuit of the transceiver device, controlling the local oscillation circuit to output during an ordinary communication, the local oscillation signal as having a reference frequency which corresponds to one of a plurality of communication channels, for the tag, and to output during sensing whether a carrier is present transmitted from another transceiver prior to the ordinary communication with the tag, the local oscillation signal as having a frequency, which is shifted by a prescribed frequency with respect to the reference frequency;
   in a demodulating circuit of the transceiver device, demodulating the carrier frequency signal modulated with the information data input through a duplexer which is connected to the transmission circuit and the reception circuit, by using the local oscillation signal shifted by the prescribed frequency; and
   cutting off a direct current component from the output of the demodulating circuit.

* * * * *